United States Patent [19]

Tanaka et al.

[11] Patent Number: 5,510,695

[45] Date of Patent: Apr. 23, 1996

[54] POWER GENERATION CONTROL SYSTEM FOR GENERATOR

[75] Inventors: Kouji Tanaka, Anjo; Tooru Aoyama, Okazaki, both of Japan

[73] Assignee: Nippondenso Co., Ltd., Kariya, Japan

[21] Appl. No.: 171,456

[22] Filed: Dec. 22, 1993

[30] Foreign Application Priority Data

Dec. 24, 1992 [JP] Japan .................................. 4-344284

[51] Int. Cl.$^6$ ...................................................... H02P 9/10
[52] U.S. Cl. ................................. 322/25; 322/59; 320/5
[58] Field of Search ............................ 322/5, 7, 25, 28, 322/51, 99; 320/35, 64; 123/339

[56] References Cited

U.S. PATENT DOCUMENTS 4,739,243  4/1988  Iwatani et al. .

FOREIGN PATENT DOCUMENTS 60-106338  6/1985  Japan .

Primary Examiner—Thomas M. Dougherty
Assistant Examiner—Nicholas Ponomarenko
Attorney, Agent, or Firm—Cushman Darby & Cushman

[57] ABSTRACT

A power generation control system for a generator is provided with a smoothing circuit, a voltage control circuit and an exciting current control circuit including a delaying circuit. When a terminal voltage of a smoothing capacitor is higher than a first reference voltage of a first comparator, a switching element is closed to supply current to an exciting coil. When a divided voltage of a voltage detecting circuit is lower than a second reference voltage of a second comparator, the smoothing capacitor is charged so that the terminal voltage thereof is gradually raised. When a detection voltage of the exciting current control circuit is higher than a third reference voltage of a third comparator, the smoothing capacitor is rapidly discharged so that the terminal voltage thereof is rapidly lowered down to a value not higher than the first reference voltage of the first comparator. Thereafter, the smoothing capacitor is charged again, in a manner as mentioned above, so that the terminal voltage thereof is gradually raised.

10 Claims, 4 Drawing Sheets

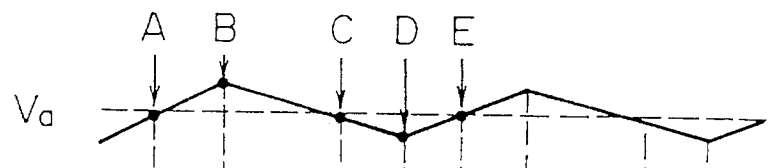
FIG. 2A
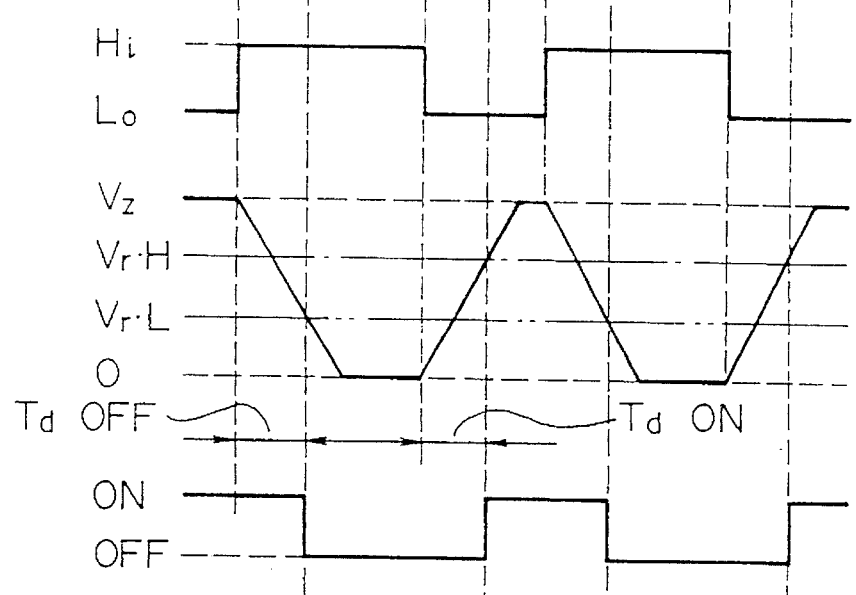
FIG. 2B
FIG. 2C
FIG. 2D
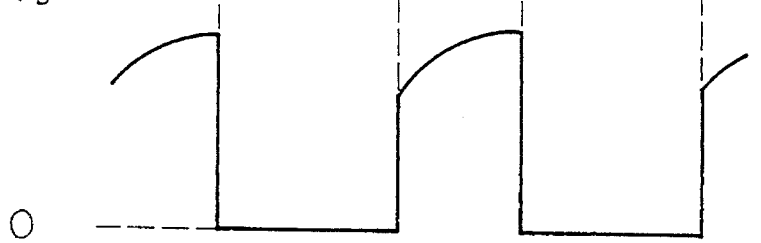
FIG. 2E
FIG. 2F  OFF F I G. 4
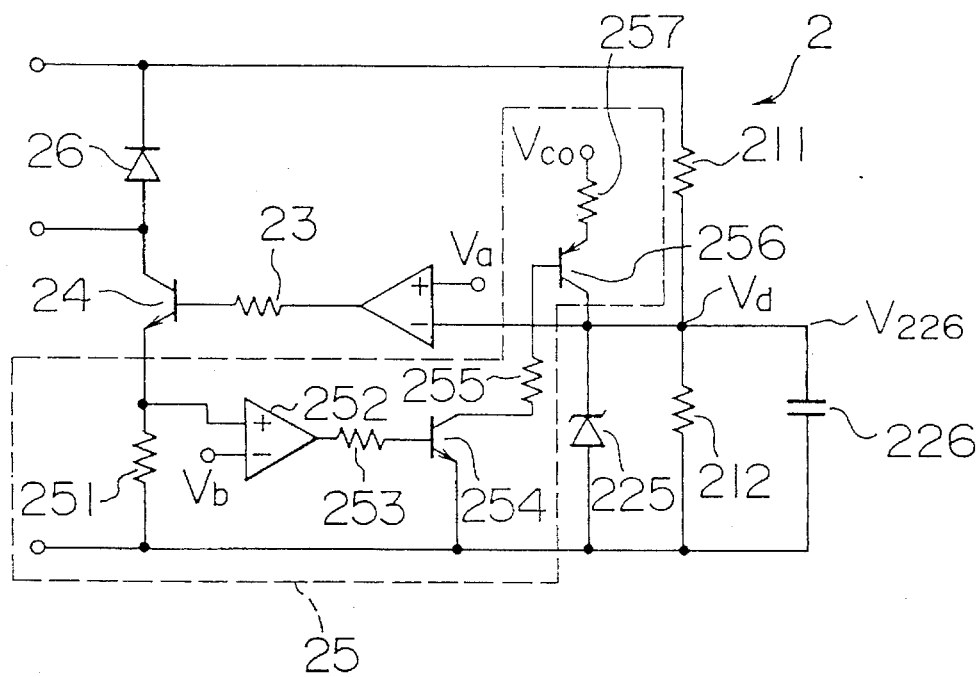

POWER GENERATION CONTROL SYSTEM FOR GENERATOR

BACKGROUND OF THE INVENTION

The present invention relates to a power generation control system for a generator which controls the value of a current flowing through an exciting coil of generator so that a generated voltage of the generator becomes a predetermined voltage and limits the exciting current value to a value not larger than a predetermined value.

BACKGROUND OF RELATED ART

Conventional control systems have a voltage control section for detecting the generated voltage of a generator or the voltage of a battery charged by a generator, and compare the detected voltage with a set voltage. The value of a current flowing through an exciting coil is controlled on the basic of the result of the comparison so as to control the power generation of the generator, thereby keeping the generated voltage or battery voltage constant.

For example, JP-A-60-106338 discloses a technique in which a voltage control section is provided with smoothing means for removing ripples or noise included in the generated voltage or battery voltage to stabilize the operation of a switching element.

Also, JP-A-62-104500 (corresponding to U.S. Pat. No. 4,739,243) discloses a technique, as shown in FIG. 5, in which an exciting current limit or control section for detects the value of a current flowing through an exciting coil and a switching element 103 is controlled on the basis of the result a comparison by a comparator 101 of the detected exciting current value with a predetermined value so that the maximum value of the exciting current is held constant. Delaying means in the exciting current section including a capacitor 104 stabilizes the operation of the switching element 103 to prevent thermal destruction which may result from high frequency switching.

However, if a power generation control system is constructed to include both the voltage control section having the smoothing means and the exciting current control section having the delaying means, the number of parts such as capacitors, which are hard to realize on an integrated circuit, are increased and hence the power generation control system becomes large in size and very high in cost.

SUMMARY OF THE INVENTION

The present invention considers the fact that either smoothing means in a voltage control section or delaying means in an exciting current limit or control section operate to delay the turn-on operation of a switching element, and an object of the present invention is to provide a construction common to both the smoothing means and the delaying means, thereby reducing the number of parts required for a power generation control system for a generator which is provided with both the voltage control section having the smoothing means and the exciting current control section having the delaying means.

To attain the above object, according to the present invention, an exciting current is controlled by voltage control means so that the generated voltage of a generator becomes a target voltage. If the exciting current exceeds a predetermined value when the exciting current is driven flown by the voltage control means, the exciting current is cut off by exciting current control means so that the maximum value of the exciting current is kept substantially constant.

Switching means for making the supply/cut-off of an exciting current is opened/closed in accordance with the terminal voltage of a capacitor element. The switching means is opened/closed in such a manner that the voltage control section charges/discharges the capacitor element in accordance with a detected voltage. Therefore, ripples, noise or the like in the detected voltage are removed by the capacitor element, thereby making it possible to stabilize the operation of the switching element. Also, the exciting current control means opens the switching means by charging or discharging the capacitor element when a detected current exceeds a predetermined value. Therefore, the switching means is closed again after the lapse of a predetermined time until charging after the discharging or discharging after the charging causes the terminal voltage of the capacitor element to reach a voltage with which the switching element is closed. Thereby, it is possible to stabilize the operation of the switching element.

According to the present invention, since the stabilization of the operation of switching means for a detected voltage and the stabilization of the operation of the switching means for a detected current can be attained by one common capacitor element, it is possible to construct a power generation control system for a generator with a reduced number of parts and to make the size of the system small.

BRIEF DESCRIPTION OF THE DRAWINGS

FIGS. 2A–2F are a time chart for explaining an example of the operation of the first embodiment;

FIG. 4 is an electric circuit diagram showing a second embodiment of the present invention.

DESCRIPTION OF THE PREFERRED EMBODIMENTS

Embodiments, in which the present invention is applied to an AC generator for a vehicle are described on the basis of the accompanying drawings.
(First Embodiment)

Figure 1:
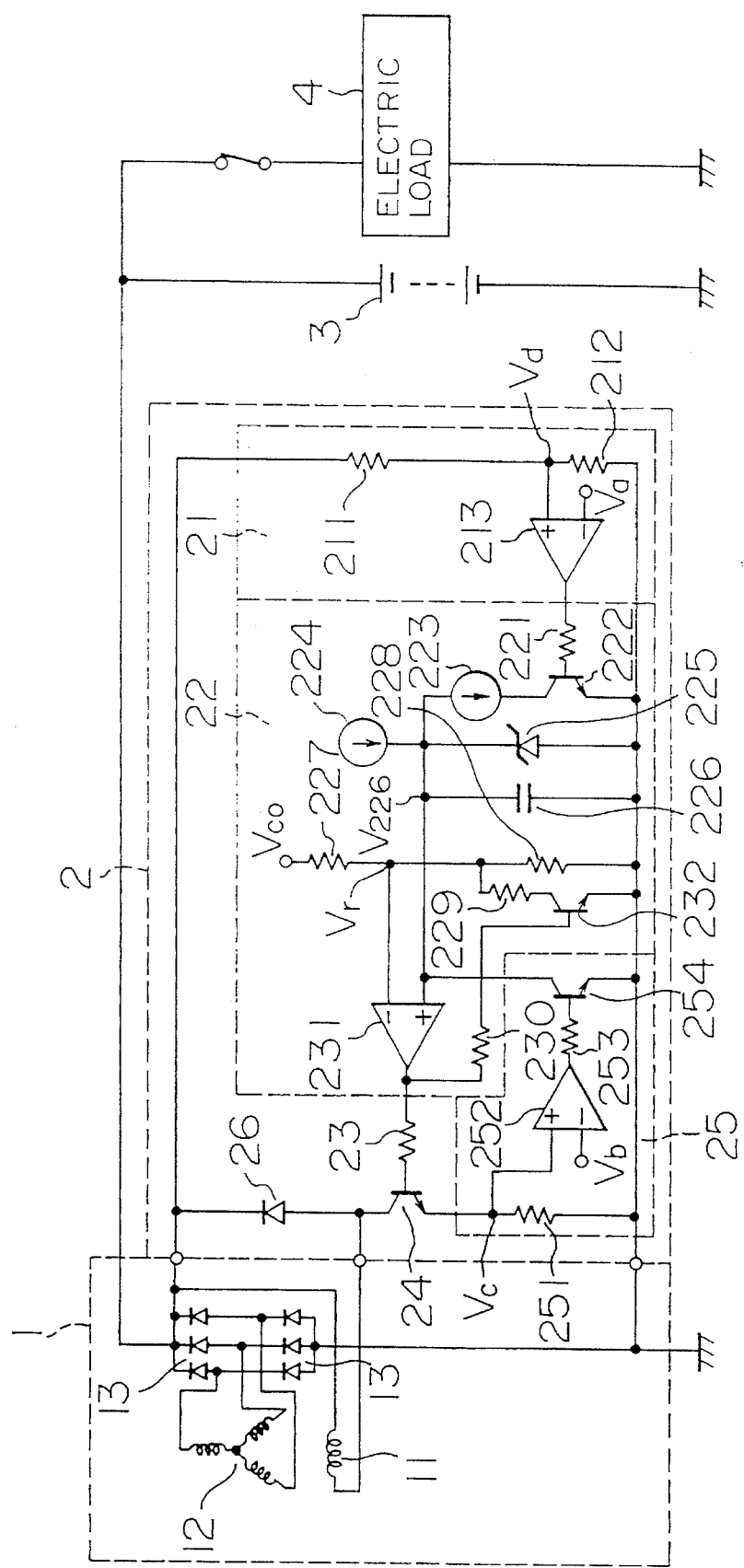
FIG. 1 is an electric circuit diagram showing a first embodiment of the present invention.

FIG. 1 is an electric circuit diagram showing a first embodiment of a power generation control system for a an AC generator for vehicle to which the present invention is applied. A three-phase AC generator 1 is driven by an engine (not shown) and includes an exciting coil 11 for generating a magnetic field when a current flows through the exciting coil, an armature coil 12 for generating electric power by the magnetic field of the exciting coil 12 and a rectifier 13 for rectifying an AC current of the armature coil 12 into a DC current. An output of the rectifier 13 is supplied to a battery 3 and each electric load 4 of the vehicle. An output of the generator 1 changes depending on the rotating speed of an engine and the value of a current flowing through the exciting coil 11 (or an exciting current value). The exciting current flowing through the exciting coil 11 is controlled by a power generation control system 2. The power generation control system 2 includes a voltage control section which is composed of a generation voltage detecting circuit 21 and a smoothing circuit 22, and a driving resistor 23 which transmits an output signal of the smoothing circuit 22 to a switching element 24; The switching element 24 is turned on by a high-level (Hi) output of the smoothing circuit 22 and turned off by a low-level (Lo) output thereof to either supply on cut-off current to the exciting coil 11; A circulating diode 26 provides the by-pass of an exciting current flowing through the exciting coil 11 when the switching element 24 is in an OFF condition, and an exciting current control circuit 25 detects an exciting current flowing through the switching element 24 to output a signal corresponding to the detected exciting current value to the smoothing circuit 22. The generation voltage detecting circuit 21 is composed of voltage dividing resistors 211 and 212 for dividing an output voltage of the generator 1 and a comparator 213 for comparing the divided voltage Vd with a predetermined value Va to output a high-level signal when the divided voltage Vd of the generated voltage is higher than the predetermined value Va. The exciting current control circuit 25 is composed of a resistor 251 which detects an exciting current flowing through the switching element 24, a comparator 252 which compares a voltage Vc corresponding to the exciting current detected by the resistor 251 with a predetermined voltage Vb (corresponding to the exciting current Ib) to output a high-level signal when the detected voltage Vc is higher than the predetermined voltage Vb, a transistor 254 which is turned on by a high-level output of the comparator 252 to discharge a capacitor 226 of the smoothing circuit 22, and a driving resistor 253 which transmits an output signal of the comparator 252 to the transistor 254. The smoothing circuit 22 is a circuit which charges and discharges the smoothing capacitor 226 in accordance with the outputs of the generation voltage detecting circuit 21 and the exciting current control circuit 25 to delay a control signal for the switching element 24. The smoothing circuit 22 is composed of the smoothing capacitor 226, a constant current source 224 which charges the smoothing capacitor 226 always with a constant current (I224), a transistor 222 which is turned on when the comparator 213 of the generation voltage detecting circuit 21 provides a high-level output, a constant current source 223 which operates at the time of an ON condition of the transistor 222 to discharge the smoothing capacitor 226 with a constant current (I223), a zener diode 225 which determines the maximum charging voltage of the capacitor 226, voltage dividing resistors 227, 228 and 229, a comparator 231 which compares a terminal voltage V226 of the capacitor 226 and a reference voltage Vr obtained by dividing a constant voltage source Vco to output a high-level signal when the terminal voltage V226 of the capacitor 226 is higher than the reference voltage Vr, a transistor 232 which is turned on by a high-level output of the comparator 231 to change the division ratio of the reference voltage Vr, and driving resistors 221 and 230 which transmit the output signal of the comparator 213 of the generation voltage detecting circuit 21 and the output of the comparator 231 to the transistors 222 and 232, respectively. The capacitor 226 is connected to the collector of the transistor 254 of the exciting current control circuit 25. The constant currents I223 and I224 by the constant current sources 223 and 224 have the relation of I223>I224. Therefore, the capacitor 226 is charged with the constant current I224 in the case where the generated voltage Vd is lower than a predetermined value and is discharged with a constant current of (I223−I224) in the case where the generated voltage Vd is higher than a predetermined value. Also, in the case where the exciting current is larger than a predetermined value (Ib), the transistor 254 is turned on so that the capacitor 226 is discharged instantaneously.

In the case where the comparator 231 outputs a low-level signal, the reference voltage Vr is set to a voltage VrH obtained by dividing the constant voltage source Vco by use of the resistors 227 and 228. On the other hand, in the case where the comparator 231 outputs a high-level signal, the reference voltage becomes VrL which is lower than VrH since the division ratio becomes small by virtue of the transistor 232 and the resistor 229.

Next, the operation of the present embodiment will be explained by use of time charts shown in FIGS. 2A–2F and 3A–3F.

First, the operation, in the case where the exciting current is not larger than the predetermined value, will be explained on the basis of FIGS. 2A–2F. In a state in which the divided voltage Vd (FIG. 2A) of the divided voltage Vd of the generator output voltage is lower than the predetermined value Va, the output of the comparator 213 (FIG. 2B) takes a low level and the smoothing capacitor 226 is charged by the constant current source 224 so that the terminal voltage V226 (FIG. 2C) of smoothing the capacitor 226 is raised gradually and ultimately up to a breakdown voltage Vz of the zener diode 225. At this time, since the terminal voltage V226 of the capacitor 226 is higher than the reference voltage VrL, the exciting coil driving switch 24 is in an ON condition (FIG. 2D) so that the exciting current is increased and hence the generator output is also increased. When the divided voltage Vd of the output voltage Vd of the generator exceeds the predetermined value Va (or Vd takes a value between A and C in FIG. 2A, the output of the comparator 213 takes a high level (FIG. 2B) and the smoothing capacitor 226 is discharged by the constant current sources 223 and 224 (or I223−I224) so that the terminal voltage V226 of the capacitor 226 is lowered gradually and ultimately down to 0 V (FIG. 2C). The switching element 24 is turned off at a point B (FIGS. 2A and 2D) delayed from a point A (or a point at which the divided voltage Vd of the output voltage of the generator exceeds the predetermined value Va) by a time Td.OFF until the smoothing capacitor 226 is discharged from the voltage Vz to the voltage VrL. When the switching element is turned off, the exciting current is decreased and the generator output voltage is also lowered. When the generator output voltage is lowered so that the divided voltage Vd becomes equal to or lower than the predetermined value Va again (or Vd takes a value between C and E in FIG. 2A), the output of the comparator 213 takes a low level (FIG. 2B) and the smoothing capacitor 226 is charged by the constant current source 224 so that the terminal voltage V226 is raised over time and ultimately reaches the voltage Vz (FIG. 2C). At this time, the switching element 24 is turned ON FIG. 2D at a point D delayed from a point C (or a point at which the divided voltage Vd of the output voltage of the generator becomes equal to or lower than the predetermined value Va) by a time Td·ON until V226 is charged from 0 V to the voltage VrH. Thus, the ON/OFF control of the switching element 24 for the output signal of the comparator 213 is made in such a manner that the turn-off and the turn-on of the switching element 24 are delayed by the delay times (Td·OFF) and (Td·ON) set beforehand in the smoothing circuit (FIG. 2(d)). The delay times Td·OFF and Td.ON can be represented by $$Td.OFF=C(Vz-VrL)/(I223-I224), \text{ and } Td \cdot ON=CVrH/I224$$

where C is the capacitance of the smoothing capacitor 226. Even in the case where the exciting current is not larger than the predetermined value Ib, a terminal voltage Vc is generated across the exciting current detecting resistor 251 (FIG. 2E) when the switching element 24 is in an ON condition.

However, since the generated voltage is lower than the predetermined voltage Vb, the transistor 254 is in an OFF condition (FIG. 2F) and hence no influence is given to the control of the switching element 24.

Next, the operation in the case where the exciting current reaches the predetermined value Ib before the divided voltage Vd of the generator output voltage reaches the predetermined value Va will be explained on the basis of FIGS. 3A–3F.

Figure 3A:
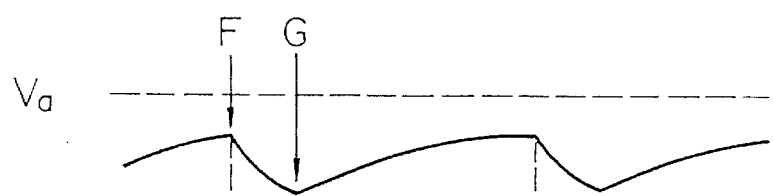
FIGS. 3A–3F are a time chart for explaining another example of the operation of the first embodiment.
Figure 3B:
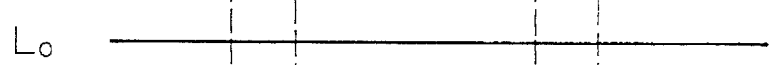
Figure 3C:
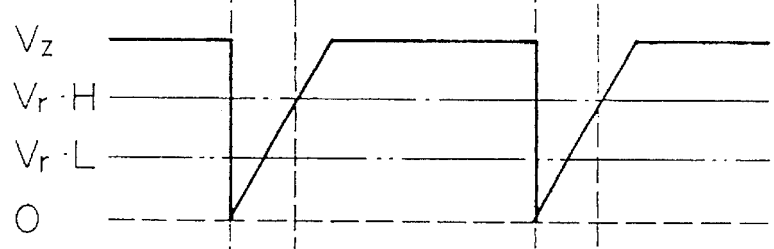
Figure 3D:
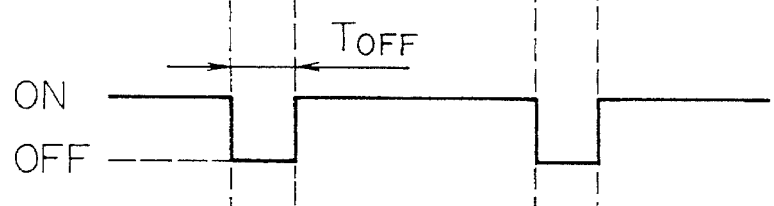
Figure 3E:
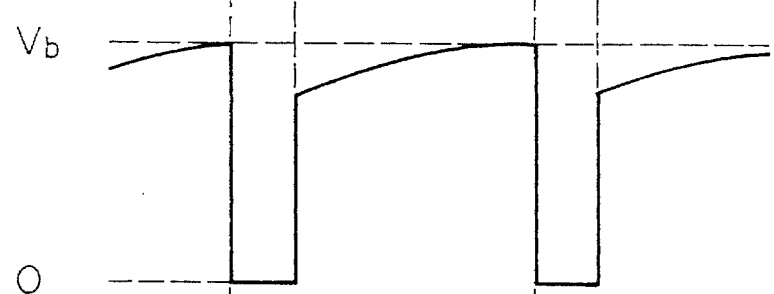
Figure 3F:
Figure 5:
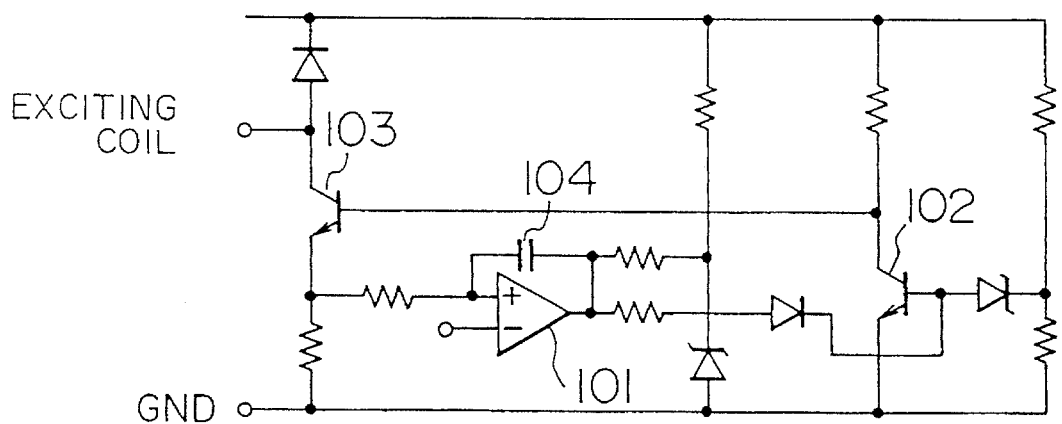
FIG. 5 is an electric circuit diagram showing the conventional exciting current control section.

Since the divided voltage Vd (FIG. 3A) of the generator output voltage is lower than the predetermined value Va, the output of the comparator 213 (FIG. 3B) takes a low level and the smoothing capacitor 226 is charged by the constant current source 224 so that the terminal voltage V226 of the smoothing capacitor 226 (FIG. 3C) is raised up to Vz. At this time, the switching element 24 is in an OFF condition so that the exciting current is increased with an increase in time and the terminal voltage Vc (FIG. 3D) of the exciting current detecting resistor 251 is also raised. At a point F in FIGS. 3A–3F when the terminal voltage Vc of the exciting current detecting resistor 251 exceeds the predetermined value Vb (FIG. 3E), the transistor 254 is turned on (FIG. 3f) so that the smoothing capacitor 226 is instantaneously discharged, thereby lowering the terminal voltage V226 down to 0 V. As a result, the terminal voltage V226 of the smoothing capacitor 226 becomes lower than VrL (FIG. 3C) so that the switching element 24 is turned off. When the switching element 24 is turned off (FIG. 3D), the transistor 224 is also turned off since the terminal voltage Vc of the exciting current detecting resistor 251 becomes 0 V (FIG. 3E). When the transistor 224 is turned off, the smoothing capacitor 226 is charged again by the constant current source 224 so that the terminal voltage V226 is raised (FIG. 3C). For a time TOFF (TOFF=Td·ON) until the terminal voltage V226 reaches the voltage VrH (or a point G in FIGS. 3A–3F, the switching element 24 takes the OFF condition (FIG. 3D) and the exciting current flowing through the exciting coil 11 is decreased circulating or bypassing through the by circulating diode 26. When the terminal voltage V226 of the smoothing capacitor 226 exceeds VrH (FIG. 3c)), the output of the comparator 231 is inverted to provide a high-level output so that the switching element 24 is turned on (FIG. 3d). When the switching element 24 is turned on, the exciting current is increased again. When the exciting current reaches the predetermined value Ib, the switching element 24 is turned off for the time TOFF so that the exciting current is decreased. Such an operation is repeated so that the exciting current is controlled to a value not larger than the predetermined value Ib. A similar effect can be realized even with the construction of a smoothing circuit in which the charging/discharging relation of the capacitor 226 in the present embodiment is reversed.

(Second Embodiment)

FIG. 4 is an electric circuit diagram showing a second embodiment of a power generation control system for an AC generator for a vehicle to which the present invention is applied. FIG. 4 corresponds to the power generation control system 2 shown in FIG. 1 and the construction of the second embodiment other than the power generation control system 2 is the same as the construction of the first embodiment other than the power generation control system 2.

The second embodiment has a construction in which a generation voltage detecting circuit and a smoothing circuit are integrated. The divided voltage Vd of a generated voltage is smoothed by smoothing a capacitor 226 and the smoothed voltage is compared with a predetermined value Va to control a switching element 24 to turn ON when a terminal voltage V226 (=Vd) of the smoothing capacitor 226 is lower than Va. When an exciting current exceeds a predetermined value, the switching element 24 is turned off by forcibly charging the smoothing capacitor by a transistor 256, resistors 255 and 257 and a constant voltage source Vco up to a breakdown voltage Vz of a zener diode 225. Thereafter, the capacitor 226 is discharged by resistors 211 and 212 to hold the switching element 24 off for a time until the terminal voltage V226 is lowered down to Va. Thereby, it is possible to control the exciting current to a value not larger than the predetermined value Ib.

We claim:

1. A power generation control system for a generator comprising:

switching means connected to an exciting coil of a generator provided with said exciting coil and an armature coil, said switching means being switched in accordance with a terminal voltage of a smoothing capacitor so as to control an exciting current to said exciting coil;

voltage control means for detecting a generation voltage generated at said armature coil, and for charging said smoothing capacitor in accordance with said detected generation voltage, said voltage control means controlling an operation of said switching means to thereby control said generation voltage generated at said armature coil to a target value; and exciting current control means for detecting said exciting current, for discharging said smoothing capacitor and controlling an operation of said switching means to cut-off said exciting current to said exciting coil when said detected exciting current exceeds a predetermined current value, said exciting current control means having precedential control of said switching means over said voltage control means.

2. A power generation control system for a generator according to claim 1, wherein:

said smoothing capacitor is charged when said generation voltage is lower than said target value, and said switching means supplies said exciting current to said exciting coil when said terminal voltage of said smoothing capacitor is less than a predetermined voltage value; and said smoothing capacitor is discharged when said exciting current exceeds said predetermined current value;

whereby said generation voltage generated at said armature coil is controlled to said target value.

3. A power generation control system for a generator according to claim 1, wherein:

said smoothing capacitor is discharged when said generation voltage is lower than said target value, and said switching means supplies said exciting current to said exciting coil when said terminal voltage of said smoothing capacitor is less than a predetermined voltage value; and said smoothing capacitor is charged when said exciting current exceeds said predetermined current value;

whereby said generation voltage generated at said armature coil is controlled to said target value.

4. A power generation control system for a generator according to claim 1, further comprising:

a first comparator comparing said detected generation voltage and a first predetermined voltage, said smoothing capacitor being charged and discharged in accordance with an output of said first comparator;

a second comparator for comparing said terminal voltage of said smoothing capacitor and a second predetermined voltage, said switching means being operated in accordance with an output of said second comparator; and a third comparator for comparing a voltage corresponding to said exciting current and a third predetermined voltage, said smoothing capacitor being forcibly discharged in accordance with an output of said third comparator.

5. A power generation control system for a generator according to claim 1, further comprising:

a first comparator for comparing said terminal voltage of said smoothing capacitor and a first predetermined voltage, said switching means being operated in accordance with an output of said first comparator; and a second comparator for comparing a voltage corresponding to said exciting current and a second predetermined voltage, said smoothing capacitor being forcibly charged in accordance with an output of said second comparator.

6. A power generation control system for a generator comprising:

switching means connected to an exciting coil of a generator provided with said exciting coil and an armature coil, said switching means one of a supply and a cut-off of an exciting current to said exciting coil;

voltage control means comprising:
  means for detecting a generation voltage generated at said armature coil,
  a smoothing capacitor to smooth said detected generation voltage by charging and discharging said smoothing capacitor in accordance with said detected generation voltage, and
  a first comparator to compare a terminal voltage of said smoothing capacitor and a first predetermined voltage, said switching means being opened and closed in accordance with an output of said first comparator, to thereby control said generation voltage to become a target value; and exciting current control means for detecting said exciting current by a current detecting element, for performing one of charging and discharging said smoothing capacitor when said detected exciting current exceeds a predetermined current value to thereby cause said switching means to cut-off said exciting current to said exciting coil, said exciting current control means having precedential control of said switching means over said voltage control means.

7. A power generation control system for a generator according to claim 6, wherein:

said smoothing capacitor is charged when said generation voltage is lower than said target value, and said switching means operates to perform one of supply and cut-off said exciting current to said exciting coil when an output voltage of said first comparator is one of high and low, respectively, to control said generation voltage to become said target value, said first comparator having a positive input terminal receiving said terminal voltage of said smoothing capacitor and having a negative input terminal receiving said first predetermined voltage; and said smoothing capacitor being discharged and said switching element being operated to cut-off said exciting current to said exciting coil when said exciting current exceeds said predetermined current value.

8. A power generation control system for a generator according to claim 6, wherein:

said smoothing capacitor element is discharged when said generation voltage is lower than said target value, and said switching means operates to perform one of supply and cut-off said exciting current to said exciting coil when an output voltage of said first comparator is one of high or low, respectively, to control said generation voltage to become said target value, said first comparator having a negative input terminal receiving said terminal voltage of said smoothing capacitor and a positive input terminal receiving said first predetermined voltage; and said smoothing capacitor element being charged and said switching element being operated to cut-off said exciting current to said exciting coil when said exciting current exceeds said predetermined current value.

9. A power generation control system for a generator according to claim 6, further comprising:

a second comparator for comparing said detected generation voltage and a second predetermined voltage, said second comparator having a positive input terminal receiving said detected generation voltage and a negative input terminal receiving said second predetermined voltage, said smoothing capacitor being one of discharged and charged when an output of said second comparator is one of high and low, respectively; and a third comparator comparing a voltage corresponding to said exciting current and a third predetermined voltage, said third comparator having a positive input terminal receiving said voltage corresponding to said exciting current and a negative input terminal receiving said third predetermined voltage, said smoothing capacitor being forcibly discharged in accordance with an output of said third comparator thereby causing said switching means to be operated to cut-off said exciting current to said exciting coil when said voltage corresponding to said exciting current exceeds said third predetermined value;

said first comparator having a positive input terminal receiving said terminal voltage of said smoothing capacitor and a negative input terminal receiving said first predetermined voltage, said switching means being operated to perform one of supply or cut-off said exciting current to said exciting coil when said output of said first comparator is one of high and low, respectively.

10. A power generation control system for a generator according to claim 6, further comprising:

a second comparator comparing a voltage corresponding to said exciting current and a second predetermined voltage, said second comparator having a positive input terminal receiving said voltage corresponding to said exciting current and a negative input terminal receiving said second predetermined voltage, said smoothing capacitor being forcibly charged in accordance with an output of said second comparator thereby causing said switching means to be operated to cut-off said exciting current to said exciting coil when said voltage corresponding to said exciting current exceeds said second predetermined value;

said first comparator having a positive input terminal receiving said first predetermined voltage and a negative input terminal receiving said terminal voltage of said smoothing capacitor, said switching means being operated to perform one of supply and cut-off said exciting current to said exciting coil when said output of said first comparator is one of high and low, respectively.

* * * * *